(12) United States Patent
Takamura et al.

(10) Patent No.: US 8,735,472 B2
(45) Date of Patent: May 27, 2014

(54) METHOD AND COMPOSITION FOR ENHANCING THE PERFORMANCE OF AN EMULSION-BASED SURFACE TREATMENT

(75) Inventors: Koichi Takamura, Charlotte, NC (US); Armin Burghart, Charlotte, NC (US); William Kirk, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/594,167

(22) Filed: Aug. 24, 2012

(65) Prior Publication Data

US 2012/0322922 A1   Dec. 20, 2012

Related U.S. Application Data

(62) Division of application No. 11/868,236, filed on Oct. 5, 2007, now Pat. No. 8,287,945.

(51) Int. Cl.
*C08L 95/00* (2006.01)
*B05D 5/10* (2006.01)
*B32B 43/00* (2006.01)

(52) U.S. Cl.
USPC ............. 524/60; 524/64; 524/457; 427/140

(58) Field of Classification Search
USPC ............. 524/60, 457, 64; 404/75; 106/273.1, 106/278
See application file for complete search history.

(56) References Cited

U.S. PATENT DOCUMENTS

| | | | |
|---|---|---|---|
| 4,011,388 A * | 3/1977 | Murphy et al. | 526/320 |
| 4,017,446 A * | 4/1977 | Rion | 524/475 |
| 4,172,061 A * | 10/1979 | Bresson | 524/68 |
| 5,085,701 A * | 2/1992 | Muller et al. | 106/273.1 |
| 5,180,428 A * | 1/1993 | Koleas | 106/277 |
| 2003/0215286 A1 * | 11/2003 | Takamura | 404/17 |
| 2005/0215673 A1 * | 9/2005 | Takamura | 524/59 |
| 2007/0238823 A1 * | 10/2007 | Takamura et al. | 524/458 |

OTHER PUBLICATIONS

ASTM D4552.ASTM International (Current publication Jul. 2010, Next oldest edition 2004.*
ASTM D 2161 Standard Practice for Conversion of Kinematic Viscosity to Saybolt Universal Viscosity or to Saybolt Furol Viscosity.*
ASTM D 2161 Standard Practice for Conversion of Kinematic Viscosity to Saybolt Universal Viscosity or to Saybolt Furol Viscosity (1993).*

* cited by examiner

*Primary Examiner* — Dah-Wei D Yuan
*Assistant Examiner* — Jose Hernandez-Diaz
(74) *Attorney, Agent, or Firm* — Meunier Carlin & Curfman, LLC

(57) ABSTRACT

The invention is a method of treating, restoring or sealing a surface comprising applying an emulsion comprising a latex polymer, a cationic emulsifier, and optionally a recycling agent to the surface to wet the surface and depositing a surface treatment layer on the surface, wherein the depositing step occurs while the surface is wetted. The invention also includes a surface pretreatment composition comprising water, at least one acrylic latex polymer, an aromatic recycling agent, and at least one cationic emulsifier. Furthermore, the invention includes the surface resulting from the application of the emulsion used in the invention and concentrated emulsions for use with the surface treatment composition.

26 Claims, No Drawings

METHOD AND COMPOSITION FOR ENHANCING THE PERFORMANCE OF AN EMULSION-BASED SURFACE TREATMENT

CROSS-REFERENCE TO RELATED APPLICATIONS

This application is a division of U.S. patent application Ser. No. 11/868,236, filed Oct. 5, 2007.

FIELD OF THE INVENTION

The present invention relates to polymer dispersions for paving applications and particularly compositions and methods for improving the performance of cold paving applications such as microsurfacing and slurry seal applications.

BACKGROUND OF THE INVENTION

Asphalt concrete, also known as asphalt pavement, is a composite material comprising mineral aggregate and asphalt (bitumen) binder which hardens to form a robust surface. Early in its life, the asphalt concrete has the ability to resist erosion, compressive deformation, and load fracture. However, as the asphalt concrete ages, the asphalt oxidizes, decreasing the binding capacity, increasing the viscosity, and further hardening the asphalt concrete. This leads to cracks in the asphalt concrete surface. Small cracks in the surface of the asphalt concrete allow for further water intrusion into the asphalt concrete, and the oxidized asphalt concrete is more susceptible to structural weakening and failure due to the reduction in binding capability.

Several surface treatment methods for aged asphalt are known which comprise adding a thin layer of modified asphalt concrete to extend the structural life of the asphalt concrete. Such surface treatment methods include chip seal, slurry seal, and microsurfacing treatments. However, the known slurry seal and microsurfacing treatments do not themselves form a water-tight layer. Without a water-tight layer, the older, underlying asphalt concrete continues to oxidize and crack thereby causing reflective cracks in the new surface layer. Furthermore, the slurry seal or microsurfacing layer does not adhere well to a highly oxidized asphalt concrete surface.

To address this problem and provide a water barrier between the old asphalt concrete and the new surface layer, a tack coat can be applied to the old asphalt concrete prior to slurry seal or microsurfacing operations. The tack coat typically comprises a cationic or anionic diluted asphalt emulsion comprising asphalt, water, latex polymer, emulsifier, and an optional aromatic recycling agent. The tack coat is applied to the old asphalt concrete surface and cured to form a continuous film on the older asphalt concrete which is air and watertight. The film prevents further oxidation and water damage of the old asphalt, concrete. If the tack coat includes a large amount of polymer latex, it can also reduce the penetration of cracks into the new surface layer (reflective cracks) and improve the adhesion between the old asphalt concrete and the new layer. The optional aromatic recycling agent can rejuvenate the older, oxidized asphalt concrete by restoring the aromatic content of the oxidized asphalt.

Another way to prevent reflective crack formation in the new surface layer is to apply a chip seal to the older asphalt pavement prior to slurry seal or microsurfacing applications. The process of applying a chip seal prior to slurry seal or microsurfacing is also known as cape seal, as it was first developed in Cape Town, South Africa. During the chip seal process, the asphalt pavement surface is first sprayed with an asphalt emulsion comprising asphalt, water, an emulsifier (typically a cationic rapid set emulsifier), and optionally a polymer latex. Then, aggregate is spread onto the asphalt emulsion and the aggregate is compacted with pneumatic tires. The chip seal surface then must be cured for 5-10 hours. Before the surface can be opened to regular use, the chip seal surface must also be swept to remove loose aggregate, typically 3-5 hours after application of the asphalt emulsion and aggregate. Chip seal uses single sized aggregate which forms a surface with a plurality of air voids. The air voids act as termination points for cracks from the older asphalt pavement thus preventing reflective crack formation in the new surface layer. After application and curing of the chip seal layer, the slurry seal or microsurfacing layer is applied. The slurry seal or microsurfacing layer then provides a traction surface.

Both the tack coat layer and the chip seal layer described above must be cured with sufficient strength to support traffic before the final surface treatment is applied. As a result, it takes a minimum of three hours for the tack coat layer or chip seal layer to be sufficiently cured such that the microsurfacing or slurry seal layer can be applied and ultimately before the asphalt concrete surface can be subjected to normal use. Moreover, with the above-described processes known in the art, two separate operations are required before an aged asphalt, concrete surface is sufficiently restored and ready for normal use. This results in prolonged lane or road closure, which is undesirable. Furthermore, the need for two separate application steps with a curing step in between adds to the cost of the treatment due to the cost of using two road crews and their equipment, in addition to the costs related to prolonged lane closure.

BRIEF SUMMARY OF THE INVENTION

The present, invention overcomes the problems of the prior art by providing a method of restoring or treating a surface with a single curing operation. In one embodiment, the method of restoring or treating a surface comprises applying an emulsion to wet the surface and depositing a surface treatment layer on the surface while the surface remains wetted with the emulsion. The emulsion preferably comprises water (typically 70% water by weight or greater), a latex polymer, an aromatic recycling agent, and an emulsifier. Preferably, the emulsifier is a cationic emulsifier. In one preferred embodiment, the aromatic recycling agent is mixed with water and an emulsifier to produce a concentrated emulsion of the aromatic recycling agent and the concentrated emulsion is combined with the emulsifier, water, and the latex polymer for use in the invention. The concentrated emulsion can be combined with the emulsifier, water, and the latex polymer, for example, by mixing the concentrated emulsion with a cationic emulsifier solution to produce a diluted emulsion of the aromatic recycling agent and mixing the diluted emulsion with a polymer latex emulsion to produce the emulsion for use in the invention. Alternatively, a concentrated emulsion including the aromatic recycling agent, polymer latex, emulsifier and water can be prepared and then diluted with water to be applied to the surface. The surface is typically an asphalt concrete surface that has undergone some degree of oxidation of the asphalt; however, the surface can be other types of surfaces, such as cement concrete, unoxidized asphalt concrete, or any other porous surface to which a surface asphalt concrete layer can be applied. In preferred embodiments, the surface treatment layer is either a microsurfacing layer or a slurry seal and can include gap graded aggregate.

The present invention also provides a method of sealing a porous surface comprising spraying the surface with an emulsion comprising water, a latex polymer, and a cationic emulsifier. The emulsion preferably further includes an aromatic recycling agent.

The present, invention further provides a surface pretreatment composition comprising water, an acrylic latex polymer, an aromatic recycling agent, and an emulsifier. The composition typically includes from 70% to 96% by weight water, from 2% to 15% by weight acrylic latex polymer, from 2% to 15% by weight aromatic recycling agent; and from greater than 0% to 2% by weight emulsifier. Preferably, a cationic emulsifier is used and the acrylic latex polymer is compatible with the cationic emulsifier in that the latex particles remain as a stable dispersion without coagulation in the presence of the cationic emulsifier. Typically, the acrylic latex polymer has an electrically neutral or cationic character prior to being combined with the aromatic recycling agent and emulsifier.

The present invention provides a concentrated emulsion of an aromatic recycling agent for use in the surface treatment composition. The concentrated emulsion preferably includes 50-80% aromatic recycling agent, greater than 0 to 4% emulsifier and 16% to less than 50% water. The water typically further contains an acid buffer such as hydrochloric or phosphoric acid to provide an acidic pH (e.g. less than 3). The concentrated emulsion of an aromatic recycling agent is then combined with water, latex polymer and additional emulsifier to produce the surface treatment composition of the invention that is applied to the surface.

In an alternative embodiment of the invention, the concentrated surface treatment emulsion can include 25-40% recycling agent, 25-40% latex polymer, greater than 0% to 6% emulsifier, and 14% to less than 50% water. The water typically further contains an acid buffer such as hydrochloric or phosphoric acid to provide an acidic pH (e.g. less than 3). In this embodiment, additional water can be added to produce the surface treatment composition of the invention that is applied to the surface.

Moreover, the present invention provides a surface comprising a base concrete layer; a cured polymer-based layer comprising a latex polymer, an aromatic recycling agent and a cationic emulsifier on top of at least a substantial portion of said base layer; a surface treatment layer comprising asphalt on top of said polymer-based layer; and an interfacial layer between said cured polymer-based layer and said surface treatment layer and comprising a blend of said cured polymer-based layer and said surface treatment layer. In accordance with this embodiment, the surface treatment layer comprises a microsurfacing or a slurry seal layer.

In a preferred embodiment of the invention, the latex polymer includes an acrylic latex polymer derived from one or more of acrylic and methacrylic polymers. For example, the latex polymer can include a styrene-acrylic latex polymer or a straight acrylic latex polymer. The styrene content is preferably from 0% to 65%, most preferably from 15 to 25% by weight. In some embodiments, the latex polymer used to form the emulsion is an essentially electrically neutral emulsion prior to being combined with the emulsifier and aromatic recycling agent. The aromatic recycling agent preferably has a low viscosity and can be, for example, RA-1.

The emulsifier in the emulsion is preferably a cationic emulsifier and more preferably includes a cationic rapid set, (CRS) emulsifier. Advantageously, the emulsion comprising a latex polymer and a small amount of CRS emulsifier quickly penetrates into hairline cracks in aged concrete or asphalt concrete and provides an air and water-tight seal over the surface. Also, the cationic charge of the emulsion allows the emulsion to better adhere to the negatively charged aged asphalt concrete to which the emulsion is applied. It was surprising and unexpected that when depositing a surface asphalt concrete layer on top of the surface wetted by the emulsion, the cure time for the surface asphalt concrete layer would be reduced. Though not wishing to be bound by theory, it is believed that after the surface layer is applied, the emulsifier acts as an accelerator in the surface layer to promote quick cohesion development and strong adhesion to the aged surface.

These and other features and advantages of the present invention will become more readily apparent to those skilled in the art upon consideration of the following detailed description, which describes both the preferred and alternative embodiments of the present invention.

DETAILED DESCRIPTION OF THE INVENTION

The present invention will now be described more fully hereinafter wherein some, but not all embodiments, of the invention are described. Indeed, the invention can be embodied in many different forms and should not be construed as limited to the embodiments set forth herein: rather, these embodiments are provided so that this disclosure will satisfy applicable legal requirements. Although specific terms are employed herein, they are used in a generic and descriptive sense only and not for purposes of limitation. The term "comprising" and variations thereof as used herein is used synonymously with the term "including" and variations thereof and are open, non-limiting terms. As used in the specification, and in the appended claims, the singular forms "a", "an", "the", include plural referents unless the context clearly dictates otherwise.

The method of restoring or treating a surface comprises applying an emulsion to wet the surface and depositing a surface treatment layer on the surface while the surface remains wetted with the emulsion. The emulsion can be applied to the surface to produce an emulsion layer that covers at least a substantial portion of the surface. The emulsion of the invention can also be used to seal a surface. The emulsion comprises water, a latex polymer, an emulsifier and typically an aromatic recycling agent. The surface to be treated, restored or sealed is typically an asphalt concrete surface that has undergone some degree of oxidation of the asphalt; however, the surface can be other types of surfaces, such as cement concrete, unoxidized asphalt concrete, or any other porous surface to which a surface asphalt concrete layer can be applied.

Emulsion

The emulsion according to the invention is preferably an aqueous emulsion comprising water, latex polymer, a cationic emulsifier, and an aromatic recycling agent. In the aqueous emulsion, water is the carrier for the other components in the emulsion. Preferably, solvents other than water are not used in the emulsion.

The emulsifier used in the emulsion according to the invention preferably includes a cationic emulsifier although a portion or all of the emulsifier used in the emulsion can include nonionic or amphoteric surfactants such as those described herein. In paving applications, asphalt emulsions are classified in ASTM D977 and D2397 by the time it takes for "set" or curing into categories into three categories: rapid setting (RS), medium setting (MS) or slow setting (SS). Before an emulsion can set, the emulsion is broken to separate the water from the particles. The breaking time is determined by the stability of the emulsion, and the more stable the emulsion, the longer the breaking time. The emulsifiers can also be classified based on the surface charge as cationic, anionic, nonionic, and amphoteric. By combining surface charge characteristic with the setting time, emulsifiers used for paving applications can be classified as, for example, cationic rapid setting (CRS), cationic medium setting (CMS), and cationic slow setting (CSS), and these classifications are known in the art and can be readily measured in an emulsion as set forth in ASTM D977 and D2397. Cationic quick setting (CQS) emulsifiers fall somewhere between CRS and CMS emulsifiers in the set rate.

Because of their rapid set times, the preferred emulsifiers according to the invention include the CRS emulsifiers. Examples of cationic emulsifiers classified as CRS emulsifiers that can be used in the invention include REDICOTE® 4819, REDICOTE® E-64R, REDICOTE® E16, REDICOTE® E-9, REDICOTE® EM-44, REDICOTE® C-346, all from Akzo Nobel Surface Chemistry and INDULIN® DF-80, INDULIN® DF-60, INDULIN® DF-40, INDULIN® DF-42, INDULIN® DF-30, INDULIN® R-20, AROSURF® AA-54, AROSURF® AA-78, AROSURF® AA-86 AND AROSURF® AA-89 from MeadWestvaco Corporation. However, CMS, CQS and CSS emulsifiers can also be used according to the invention.

The amount of emulsifier in the emulsion is preferably sufficient to both maintain a stable emulsion and adequately wet the surface to which it is applied. This concentration can vary based the type of emulsifier used and on the other components of the emulsion, but is generally from greater than 0 to 2% by weight of the emulsion and more preferably from 0.1% to 0.5% by weight of the emulsion. As discussed above, the preferred emulsifier is a cationic emulsifier although the emulsifier can include nonionic and/or amphoteric surfactants. For example, the emulsion can include a small amount of a nonionic or amphoteric surfactant (less than 0.3% by weight of the emulsion, and more preferably less than 0.1% by weight of the emulsion) as part of the total emulsifier concentration.

The emulsion according to the invention comprises a latex polymer, preferably an acrylic latex polymer. The latex polymer, prior to the addition of the emulsifier used in the emulsion applied to the surface, can be a cationic polymer dispersion, an essentially electrically neutral polymer dispersion, or a combination thereof. Essentially electrically neutral polymer dispersions can include those described in pending U.S. application Ser. Nos. 11/399,816; 11/399,817 and 11/400,623, filed Apr. 7, 2006 and which are hereby incorporated by reference in their entirety. Methods of preparing the essentially electrically neutral emulsions are described in more detail hereinbelow.

The acrylic latex polymer used in the invention is derived from one or more of acrylic and methacrylic monomers. The acrylic latex polymer can be a straight acrylic polymer or a styrene acrylic polymer and is preferably a styrene-acrylic polymer. The total (meth)acrylic and (meth)acrylate (i.e. acrylic) content is from 35% to 100%, more preferably 45-90%, and most preferably 65-85% by weight. The styrene content of the acrylic latex is preferably from 0% to 65%, more preferably 5-50% or 10-30%, and most preferably 15-25% by weight. The polymer can be derived from up to 10% by weight of other monomers such as acrylonitrile and acrylamide. The latex polymer preferably has a glass transition temperature, $T_g$, of below 40° C., and more preferably below 20° C. It, has been found that, the acrylic latex polymers of the invention advantageously are not tacky when applied and cured and thus are less likely to adhere to machinery used to apply the surface treatment layer than conventional latex polymers (e.g. SBR latex polymers) used in paving applications. The emulsion according to the invention preferably comprises 2 to 15% by weight latex polymer, more preferably 3 to 10% by weight latex polymer, most preferably 4 to 7% by weight latex polymer (e.g. 5% by weight latex polymer).

The recycling agent of the emulsifier according to the invention can include any known recycling agent appropriate for the type of asphalt surface that the emulsion is applied to. Recycling agents are classified into types such as RA-1, RA-5, RA-25, and RA-75 as defined by ASTM D4552. The recycling agent used according to the invention is preferably material that resembles the maltene fraction of asphalt such as a RA-1 recycling agent, a RA-5 recycling agent, or mixtures thereof. More preferably, the recycling agent is a RA-1 recycling agent such as those available as RA-1 from vendors such as San Joaquin Refining or Tricor Refining or under the trade name HYDROLENE® (such as HYDROLENE® HT100T) from Sunoco.

Though not wishing to be bound by theory, it is believed that the recycling agent in the emulsion penetrates the surface it is applied to and replenishes the oily component that degrades over time in an asphalt surface. Preferably, the recycling agent as used in the emulsion is high in aromatics and polar materials. The amount of recycling agent in the emulsion can be adjusted depending on the condition of the surface where the emulsion will be applied. If the surface is highly oxidized aged asphalt concrete, the amount of recycling agent can be increased to ensure adequate dosing of the aged asphalt concrete with the recycling agent. Alternately, if the surface is not asphalt concrete or has little to no oxidation of the asphalt, the recycling agent can be reduced or omitted altogether from the emulsion formulation.

Preferably, the amount of aromatic recycling agent is from 0 or greater than 0 to 15% by weight, more preferably from 2 to 15% or 2 to 8% by weight, and most preferably from 3% to 6% by weight (e.g. 5% by weight). The ratio of the aromatic recycling agent to the latex polymer is preferably from 1:10 to 5:1, more preferably from 1:3 to 3:1, 1:2 to 2:1, or about 1:1.

Preferably, the composition of the invention does not include or is substantially free of (includes less than 0.1% by weight) asphalt. However, although not preferred, a small portion (up to 10% by weight) of the recycling agent can be replaced by asphalt and the asphalt can be present in the emulsion in an amount of less than 0.5% by weight.

The emulsion can optionally further include other components in small amounts. For example, the emulsion can include oxidation reducers that impart further beneficial properties to the surface to which the emulsion is applied. An example of an oxidation reducer is carbon black, which darkens the surface and prevents further oxidation. These additional components are included in an amount from 0 to about 2% by weight.

The balance of the composition includes water in an amount of from 70% to 96% by weight, more preferably 80%-90% by weight.

The pH of the emulsion as applied is preferably from 1 to 4, particularly when the preferred cationic emulsifiers described herein are used. Nevertheless, a higher pH can be used depending on the type of emulsifier(s) included in the emulsion. For pH's of 1 to 4, the water typically further contains an acid buffer such as hydrochloric or phosphoric acid to provide the acidic pH.

Production of the Electrically Neutral Polymer Dispersion

In one preferred embodiment, an essentially electrically neutral polymer dispersion can be used in the emulsion. The essentially electrically neutral polymer dispersion has a surface charge that is approximately (essentially) electrically neutral and can be prepared using a dispersion, mini-emulsion, or emulsion polymerization process, and preferably an emulsion polymerization process is used. The emulsion polymerization process can be continuous, batch, or semi-batch and is preferably a semi-batch process. The process for preparing the essentially electrically neutral polymer dispersion can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-219.

The essentially electrically neutral polymer dispersion is preferably prepared by first charging a reactor with a seed latex, water, and optionally at least, one nonionic surfactant and/or at least one of the monomers. The seed latex helps initiate polymerization and helps produce a polymer having a consistent particle size. Any seed latex appropriate for the specific monomer reaction can be used and preferably a polystyrene seed is used. The initial charge typically also includes a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature, for example, to between 50° C. and 100° C. Preferably, the initial charge is heated to a temperature between 70° C. and 95° C.

After the initial charge, the monomers that are to be used in the polymerization can be continuously fed to the reactor in one or more monomer feed streams. The monomers are preferably supplied as a pre-emulsion in an aqueous medium. Typically, an initiator feed stream is also continuously added to the reactor at the time the monomer feed stream is added although it may also be desirable to include at least a portion of the initiator solution to the reactor prior to adding a monomer pre-emulsion if a pre-emulsion is used in the process. The monomer and initiator feed streams are typically continuously added to the reactor over a predetermined period of time (e.g. 1.5-5 hours) to cause polymerization of the monomers and to thereby produce the polymer dispersion. The nonionic surfactant according to the invention and any other surfactants are also typically added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

As mentioned above, the monomer feed stream can include one or more monomers. The monomers can be fed in one or more feed streams with each stream including one or more of the monomers being used in the polymerization process. It can also be advantageous to delay the feed of certain monomers to provide certain polymer properties or to provide a layered structure (e.g. a core/shell structure). In accordance with the invention, one monomer can be provided in the polymerization process to produce a homopolymer although typically two or more monomers are copolymerized to produce a copolymer.

The monomers for use in the electrically neutral polymer dispersion are preferably nonionic monomers. Exemplary nonionic monomers include styrene, C1-C10 alkyl and C2-C10 hydroxyalkyl esters of acrylic and methacrylic acid (e.g. ethyl acrylate, ethyl methacrylate, methyl methacrylate, 2-ethylhexyl acrylate, butyl acrylate, butyl methacrylate, hydroxypropyl acrylate, hydroxypropyl methacrylate, dimethylhydroxypropyl (meth)acrylate, 2-hydroxyethyl acrylate, hydroxyethyl methacrylate, 2-hydroxybutyl methacrylate and 2-propylheptyl (meth)acrylate), 2-acetoacetoxyethyl methacrylate (AAEM), 1,4-butanediyl diacrylate, acrylamide, methacrylamide, N-methylacrylamide, N,N-dimethylacrylamide, N,N-diethylacrylamide, N-isopropylacrylamide, N-t-butylacrylamide, N-methylolacrylamide, N-vinylformamide, N-vinylmethylacetamide, vinyl esters (e.g. vinyl acetate, vinyl propionate, vinyl butyrate, and vinyl caprolate), divinylbenzene, vinyltriethoxysilane, t-butylstyrene, isopropylstyrene, p-chlorostyrene, acrylonitrile, methacrylonitrile, C4-C8 dienes (e.g. butadiene), isoprene, vinyl chloride, vinylidene chloride, and the like, and mixtures thereof. The monomers used according to the invention can include cross-linking monomers, such as butadiene, 1,4-butanediyl diacrylate, and divinylbenzene.

The monomers for use in the electrically neutral polymer dispersion can also include a small amount (0.5% by weight or less, based on the total monomer weight) of one or more ionic monomers. Exemplary ionic monomers include carboxylic acid monomers (e.g., itaconic acid, fumaric acid, acrylic acid, and methacrylic acid).

In one preferred method for producing an essentially electrically neutral polymer dispersion, the monomers include styrene and at least one monomer selected from the group consisting of (meth)acrylate monomers, to produce a styrene-acrylic latex. More preferably, the meth(acrylate) monomers include one or more monomers selected from the group consisting of 2-ethylhexylacrylate, n-butylacrylate, and methyl methacrylate. In another preferred embodiment of the invention, a straight acrylic polymer can be produced using (meth)acrylate monomers such as the acrylate and methacrylate monomers listed above. For both the styrene acrylic and straight acrylic polymer dispersions, the monomers also preferably include acrylamide, methacrylamide and derivatives thereof (e.g. N-methylacrylamide, N,N-dimethylacrylamide, N,N-diethylacrylamide, N-isopropylacrylamide, N-t-butylacrylamide, and N-methylolacrylamide) to increase the stability of the dispersion.

The molecular weight of the polymers in the electrically neutral polymer dispersion produced by the process described above can be adjusted by adding a small amount of molecular weight regulators, generally up to 2% by weight, based on the monomers being polymerized. Particular regulators which can be used are organic thio compounds, preferably tert-dodecylmercaptan, and also allyl alcohols and aldehydes.

The initiator feed stream used in accordance with the invention can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described e.g., by A. S. Sarac in *Progress in Polymer Science* 24(1999), 1149-1204. Preferred initiators include azo initiators and aqueous solutions of sodium persulfate. The initiator stream can optionally include one or more buffers or pH regulators, such as those described above.

In addition to the monomers and initiator, a nonionic surfactant is fed to the reactor. The nonionic surfactant can be provided in the initial charge of the reactor, provided in the monomer feed stream, provided in an aqueous feed stream, provided in a pre-emulsion, provided in the initiator stream, or a combination thereof. The nonionic surfactant can also be provided as a separate continuous stream to the reactor. The nonionic surfactant is typically provided in an amount of 1-5% by weight in the electrically neutral polymer dispersion, based on the total weight of monomer and surfactant, and is preferably provided in an amount less than 2% by weight in the electrically neutral polymer dispersion.

The preferred nonionic surfactant in producing the essentially electrically neutral polymer dispersion comprises an alkylene oxide adduct such as an ethylene oxide $(EO)_m$, propylene oxide $(PO)_n$ and/or butylene oxide $(BO)_p$ adduct of an alkyl, alkylbenzene or dialkylbenzene alcohol wherein $0<(m+n+p)\leq 14$, preferably $0<(m+n+p)\leq 12$, and more preferably $0<(m+n+p)\leq 10$ (e.g. $6\leq(m+n+p)\leq 10$). The nonionic surfactant can comprise an ethylene oxide adduct of an alcohol (with n=0 and p=0), a propylene oxide adduct of an alcohol (with m=0 and p=0), a butylene oxide adduct of an alcohol (with m=0 and n=0), or an adduct of an alcohol with a combination of two or more of ethylene oxide, propylene oxide and butylene oxide (with two or more of m, n and p being greater than 0). In the event that two or more of m, n and p are greater than 0, the ethylene oxide, propylene oxide and/or butylene oxide can be provided as a random or block copolymer. More preferably, the nonionic surfactant is an ethylene oxide adduct of an alkyl alcohol, with n=0 and p=0. The alkyl alcohol is preferably a branched or straight chain hydrocarbon having a single hydroxyl group, preferably a terminal hydroxyl group, that is ethoxylated. The alkyl group preferably includes 10 to 22 carbon atoms and more preferably 10 to 16 carbon atoms. Particularly preferred nonionic emulsifiers are ethylene oxide $(EO)_m$ adducts of tridecyl alcohol, wherein m=6, 8, or 10, such as those available from BASF under the LUTENSOL™ trademark. The term "nonionic" as used herein refers to materials that do not dissociate in the dispersion into positively and negatively charged species.

The nonionic surfactant for producing the essentially electrically neutral polymer dispersion preferably has a cloud point temperature below the polymerization temperature used to produce the polymer dispersion when the polymerization is in an aqueous solution. The cloud point temperature, also known as a cloud point, cloud temperature, or solubility inversion temperature, is the temperature at which the nonionic surfactant solution becomes cloudy (i.e. at and above that temperature the solution appears cloudy or turbid). As used herein, the cloud point temperature refers to the cloud point of a 1% aqueous solution of the surfactant. The cloud point temperature can be determined by visual observation of the solution over a range of temperatures, or by light scattering measurements. As used herein, the cloud point temperature is determined using ASTM D-2024-65R03. Preferably, the cloud point temperature for a 1% aqueous solution of the nonionic surfactant is between 30° C. and 90° C., more preferably between 35° C. and 85° C. For the preferred ethylene oxide $(EO)_m$ adducts of tridecyl alcohol, wherein m=6, 8, or 10, the cloud point temperatures are 38-43° C., 40-45° C., and 73-82° C., respectively. The nonionic surfactant also preferably has a HLB (hydrophilic lipophilic balance) at room temperature such that $8<HLB<15$. More preferably, the HLB is 14 or less.

In addition to the nonionic surfactant described above, it may also be desirable to include an additional nonionic surfactant. Suitable nonionic surfactants include polyoxyalkylene alkyl ethers and polyoxyalkylene alkylphenyl ethers (e.g. diethylene glycol monoethyl ether, diethylene glycol diethyl ether, polyoxyethylene lauryl ether, polyoxyethylene stearyl ether, and polyoxyethylene nonylphenyl ether); oxyethylene-oxypropylene block copolymers; sorbitan fatty acid esters (e.g. sorbitan monolaurate available as SPAN® 20 from Merck Schuchardt OHG, sorbitan monooleate available as SPAN® 80 from Merck Schuchardt OHG, and sorbitan trioleate available as SPAN® 85 from Merck Schuchardt OHG); polyoxyethylene sorbitan fatty acid esters (e.g. polyoxyethylene sorbitan monolaurate available as TWEEN® 20 and TWEEN® 21 from Uniqema, polyoxyethylene sorbitan monopalmitate available as TWEEN® 40 from Uniqema, polyoxyethylene sorbitan monstearate available as TWEEN® 60, TWEEN® 60K, and TWEEN® 61 from Uniqema, polyoxyethylene sorbitan monooleate available as TWEEN® 80, TWEEN® 80K, and TWEEN® 81 from Uniqema, and polyoxyethylene sorbitan trioleate available as TWEEN® 85 from Uniqema); polyoxyethylene sorbitol fatty acid esters (e.g. tetraoleic acid polyoxyethylene sorbitol); glycerin fatty acid esters (e.g. glycerol monooleate); polyoxyethylene glycerin fatty acid esters (e.g. monostearic acid polyoxyethylene glycerin and monooleic acid polyoxyethylene glycerin); polyoxyethylene fatty acid esters (e.g. polyethylene glycol monolaurate and polyethylene glycol monooleate); polyoxyethylene alkylamine; and acetylene glycols.

It may also be desirable to include one or more amphoteric surfactants in the polymerization step. Suitable amphoteric surfactants include those described in U.S. Pat. No. 6,540,822, which is herein incorporated by reference. An exemplary amphoteric surfactant is REDICOTE® E-7000, which is available from Akzo Nobel.

Although additional nonionic or amphoteric surfactants can be combined with the nonionic surfactant of the invention, an anionic surfactant is typically not included in the emulsion polymerization reaction. Furthermore, a cationic surfactant is typically not used in producing the essentially electrically neutral polymer dispersion. However, because a cationic emulsifier will be added to the polymer dispersion before application to the asphalt concrete surface, additional cationic surfactants can be added in the polymerization step or at another step in the process.

Once polymerization is completed, the essentially electrically neutral polymer dispersion is preferably chemically stripped thereby decreasing its residual monomer content. This stripping process can include a chemical stripping step and/or a physical stripping step. Preferably, the polymer dispersion is chemically stripped by continuously adding an oxidant such as a peroxide (e.g. t-butylhydroperoxide) and a reducing agent (e.g. sodium acetone bisulfite), or another redox pair to the reactor at an elevated temperature and for a predetermined period of time (e.g. 0.5 hours). Suitable redox pairs are described by A. S. Sarac in *Progress in Polymer Science* 24, 1149-1204 (1999). An optional defoamer can also be added if needed prior to or during the stripping step. In a physical stripping step, a water or steam flush is used to further eliminate the non-polymerized monomers in the dispersion. Once the stripping step is completed, the pH of the polymer dispersion can be adjusted and a biocide or other additives can be added. Cationic and/or amphoteric surfactants can optionally be added after the stripping step or at a later time if desired. The polymer particles of the resultant polymer dispersion preferably have an average particle size from 100 to 500 nm, more preferably 130-250 nm. The polymer particles prepared according to the invention are characterized by having a narrow particle size distribution. Specifically, the resultant volume-average distribution of polymer particles in the polymer dispersion preferably has a standard deviation of less than 30%.

Once the polymerization reaction is complete, and the stripping step is completed, the temperature of the reactor is reduced, thus making the nonionic surfactant water-soluble. While not wishing to be bound by theory, it is believed that the hydrocarbon chain of the nonionic surfactant immobilizes the surfactant into the monomer swollen particles, and the surfactant becomes physically trapped in the polymer chain. On the other hand, it is believed that the hydrophilic $(EO)_m$ and/or $(PO)_n$ chain remains at the polymer particle/water interface and extends towards the water phase, providing colloidal stability for the polymer dispersion. Therefore, though the polymerization temperature is below the cloud point temperature of the nonionic surfactant, the surfactant molecules do not migrate to the water phase. Thus, because there are limited amounts of free nonionic surfactant in the water phase of the latex, it is believed that the mechanical properties of the dried film are not adversely affected by the presence of the nonionic surfactants.

The polymer dispersion following the polymerization step as outlined above is essentially electrically neutral in that, there are either essentially no charged groups in the polymer or there is essentially a balance of anionic and cationic charged groups in the polymer. The electrophoretic mobility ($\mu$) of the polymer dispersion can be used to measure the zeta potential to show the charge of the polymer dispersion although it is noted that the measurement may indicate an anionic character even though the polymer dispersion is essentially electrical neutral. For example, the resulting polymer dispersion can have a low negative surface charge due to the presence of grafted sulfate groups when a persulfate initiator is used or due to water molecules being absorbed to the polymer surface. However, the polymer dispersion would be classified as an essentially electrically neutral polymer dispersion as it is neutral and non-ionic in terms of the dispersion stability and acts with a nonionic character upon addition of anionic or cationic surfactants, electrolytes, or high valency electrolytes. Examples of dispersions that are essentially electrically neutral in terms of dispersion stability and act with a nonionic character, but have ionic zeta potential measurements are provided in S. Usui, Y. Imamura and E. Barouch, Destabilization of oil-in-water emulsion with inorganic electrolytes in the absence and in the presence of sodium dodecyl sulfate, J. Dispersion Science and Technology 8(4), 359-384 (1987) (measured zeta potential of decane particles as a function of electrolyte concentration show strongly negatively charged even without the anionic surfactant) and S. Usui and H. Sasaki, Zeta potential measurements of bubbles in aqueous surfactant solutions, J. Colloid and Interface Science, 65(1), 36-45 (1978) (zeta potential of argon gas bubbles in the presence of nonionic surfactant $C_{12}POE$ measures highly negative).

Because of the absence of anionically charged surfactants and vinyl acids, the polymer dispersions of the invention are colloidally stable at a wide range of pH's, can include no or low levels of electrolytes, and are stable (do not coagulate) in the presence of the cationic emulsifier. Moreover, the electrically neutral polymer dispersions of the invention have a low electrical conductance and a high electrical resistance as is desirable as an additive to cement or application to asphalt to act as a moisture barrier.

Preparation and Application of the Emulsion

The emulsion applied according to the invention includes water, at least one polymer latex, a cationic emulsifier, and for asphalt applications a recycling agent. These ingredients can be combined in any order to form a stable emulsion. Preferably, a concentrated emulsion is provided including the recycling agent and that emulsion is shipped or stored and the sprayable emulsion is prepared from the concentrated emulsion.

In one preferred embodiment, a base emulsion comprising water, the recycling agent, and a nonionic, cationic or amphoteric surfactant is first prepared. The concentrated emulsion preferably includes 50-80% and more preferably 60-75% by weight aromatic recycling agent, greater than 0 to 4% and more preferably 0.1 to 1.5% by weight emulsifier, and 16% to less than 50% and more preferably 24 to 40% by weight water. The water typically further contains an acid buffer such as hydrochloric or phosphoric acid to provide an acidic pH (e.g. less than 3). The concentrated emulsion of an aromatic recycling agent is then combined with water, latex polymer and additional emulsifier to produce the surface treatment composition of the invention. For example, an aqueous cationic emulsifier solution can be mixed with the base emulsion, which dilutes the base emulsion. A latex emulsion such as a cationic or an electrically neutral latex emulsion can then be added to the diluted base emulsion, typically in a ratio of latex emulsion to diluted base emulsion of from 1:5 to 1:20, preferably about 1:10. The pH can be adjusted at each step with hydrochloric or phosphoric acid. The preferred pH of the emulsion to be applied to the surface is from about 1 to about 4. The resulting emulsion includes amounts of the water, latex polymer, recycling agent and emulsifier consistent with the values discussed herein.

In an alternative embodiment of the invention, a concentrated surface treatment emulsion that includes 25-40% more preferably 30-38% by weight recycling agent, 25-40% and more preferably 30-38% by weight latex polymer, greater than 0% to 6% and more preferably 1.0-2.5% by weight emulsifier, and 14% to less than 50% and more preferably 22-39% by weight water. For example, the composition could include 35% aromatic recycling agent, 35% latex polymer, 2% emulsifier and 28% water. The water typically further contains an acid buffer such as hydrochloric or phosphoric acid to provide an acidic pH (e.g. less than 3). In this embodiment, additional water and optionally additional acid buffer can be added to produce the surface treatment composition of the invention that is applied to the surface.

The emulsion is applied to a surface to be treated, restored or sealed according to the invention. Prior to application of the emulsion, the surface to be treated is usually cleaned to remove excess surface dirt, weeds, and contaminants by, for example, brushing the surface, blasting the surface with compressed air, or washing the surface.

The emulsion can be applied using any suitable method for applying a liquid to a porous surface, such as brushing, wiping and drawing, or spraying. Spraying is the preferred method of application of the emulsion because a very thin layer of the emulsion can be applied in a short period of time. The emulsion is preferably applied at a temperature between 60° F. and 150° F. The emulsion also has a viscosity at the application temperature that allows it to be sprayed upon the surface and preferably has a viscosity of from 1 to 5 centipoise. The emulsion of the invention is preferably applied in an amount of 0.01-0.10 gal/yd$^2$ to the surface. Because of the low application rate and viscosity of the emulsion, the emulsion forms a very thin emulsion layer on the aged concrete surface and provides substantially no binding strength to the aged concrete surface, even when it is fully cured. For example, to the extent the resulting emulsion layer has any thickness at all, the emulsion layer has a thickness of 2 mm or less.

The emulsion once applied wets the surface thereby forming an emulsion layer on at least a portion and typically at least a substantial portion (e.g. more than 50%) of the surface. When the emulsion is applied to the aged concrete surface, water loss occurs in the emulsion, primarily due to adsorption of the water to the old pavement surface. The water also delivers the emulsifier, aromatic recycling agent and latex polymer to the aged concrete surface. Preferably, the emulsion penetrates and adheres to the surface it is applied to, cures in a reasonably rapid time, and provides a water-tight and air-tight barrier on the older surface. The emulsion layer also promotes adhesion between the older surface and the later applied surface treatment layer. It is desirable for the emulsion to be easily applied and have an adequate shelf life.

With a traditional slurry seal or microsurfacing operation, the surface to which the slurry seal or microsurfacing layer is to be applied is sprayed with water to prewet the surface. The paving machines used for microsurfacing and slurry seal ordinarily have water tanks and spraying equipment already mounted. These spraying systems can be used for the emulsion instead of being used just for water. Therefore, the emulsion can be applied to the surface immediately prior to application of the surface layer in a single operation. Thus, both the time for application and time for curing, as well as the costs associated with preventive maintenance operations, are reduced.

Typically, the paving machines used for the slurry seal and microsurfacing operations have limited space to store materials. Accordingly, a concentrated emulsion comprising the recycling agent is typically produced at an asphalt emulsion plant and then transported to the job site and loaded to a tank associated with the paving machine. This concentrated emulsion can then be diluted with water and any additional components (e.g. cationic emulsifier, polymer latex, and acid buffer) can be added to the paving machine for application to the surface to the treated.

The emulsion penetrates visible and microscopic cracks of the aged surface. Though the surface layer is applied while the aged surface is wetted with the emulsion, the water evaporates from the emulsion after application of the surface layer to form a continuous polymer film over the aged surface and in the cracks of the surface. This film over the aged surface provides a seal which is both water tight and air tight, absorbs stress, adheres strongly to the aged pavement, and prevents or reduces formation of reflective cracks in the new surface layer.

Application of the Surface Layer

After the aged surface is wetted with the emulsion as described above, the surface layer of asphalt concrete is deposited onto the wetted aged surface using a cold paving technique such as microsurfacing or slurry seal. The composition of the surface layer mixture includes asphalt mixtures used for microsurfacing, slurry seal, or cold mix paving. The surface treatment layer as applied includes asphalt (bitumen), water, an emulsifier, aggregate, optional polymer modifiers, and optional additives.

The specifications for classifying the aggregate for use in microsurfacing and slurry seal applications have been developed by the International Slurry Surfacing Association in "Recommended Performance Guidelines for Emulsified Asphalt Slurry Seal," A105 (Revised), June 2004 and "Recommended Performance Guidelines for Micro-Surfacing," A143 (Revised), June 2004 and by the Federal Highway Administration in "Surface Rehabilitation Techniques: State of the Practice Design, Construction, and Performance of Microsurfacing," Hassan Raza, Federal Highway Administration, FHWA-SA-94-051. For microsurfacing applications, the aggregate can be an ISSA Type II or III aggregate. For slurry seal applications, the aggregate can be an ISSA Type I, II or III aggregate. Suitable aggregates for use in the invention include Delta aggregate and Transpcos aggregate (ISSA Type II aggregates commercially available from Capitol Aggregates) and Blue Circle aggregate (an ISSA Type II aggregate commercially available from Blue Circle). The aggregate is typically wetted with from about 4 to about 16 parts by weight water, more preferably, from about 8 to about 15 parts by weight water, prior to being combined with the other components of the formulation. The amount of water added is typically dependent on the fines content and their activity in the aggregate.

In a preferred embodiment, gap-graded aggregate is used in the surface layer mixture. Gap-graded aggregate allows for faster evaporation of water from the surface seal which decreases the amount of time for curing the surface layer. Because of the larger aggregate used, the surface layer has more void space than if a single modal aggregate is used. The resulting cured surface layer provides excellent skid resistance on the driving surface because rainwater drains quickly through the voids within the surface layer. A surface layer with a high degree of voids (for example, through the use of gap-graded aggregate) also reduces the traffic noise.

The surface layer formulation of the invention includes an asphalt (bitumen) emulsion, and the asphalt emulsion is preferably added to the surface layer formulation in an amount from about 8 to about 25 parts by weight, and more preferably in an amount from about 10 to about 15 parts by weight. Suitable asphalt emulsions for the surface layer formulation include SS-1, SS-1h, CSS-1, CSS-1h, CQS-1h and QS emulsions, particularly for slurry seal formulations, and more preferably include an emulsion including a CQS or CMS emulsifier and a small amount of a CRS emulsifier. For microsurfacing applications, the asphalt emulsion for the surface layer formulation preferably is a CSS-1h emulsion that has been polymer-modified as discussed in more detail below and that preferably includes a small amount of a CRS emulsifier. Preferably, the asphalt emulsions for the surface layer formulation include between about 30 and about 80 percent, bitumen (asphalt), and more preferably, between about 65 and about 75 percent bitumen. The bitumen preferably has a mean particle diameter of about 1 to about 10 microns, more preferably, about 2 to about 3 microns. The asphalt emulsions conventionally used in cold paving applications have a pH in the range of 1.0 to 1.5 and are typically made with an asphalt having a high acid number. Typically, the pH of the asphalt emulsion is produced through the use of acids such as hydrochloric, phosphoric, sulfuric, acetic, formic and oxalic acids. It is well known in the art that asphalt emulsions having higher pH's have been known to either not develop enough cohesion or to have slow cohesion development resulting in increased curing time being needed before the newly paved surface can be opened to traffic. The asphalt emulsions used in accordance with the invention can have a pH in the range of 1.0 to 1.5 but pH's in this range are not required and asphalt emulsions having a pH of greater than 1.5, or even greater than 2.0 or 3.0, can be used in accordance with the invention. In addition, the asphalt formulations can include a surfactant and suitable surfactants are conventional in the art. Preferably, the asphalt emulsion adheres to the standards of the ASTM D977, ASTM D2397, AASHTO M140 and AASHTO M208.

The asphalt emulsion for the surface treatment layer formulation is typically prepared by first preparing a soap solution containing water and one or more surfactants, and then adjusting the pH of the soap solution using an acid such as HCl as mentioned above. The soap solution and preheated asphalt are then generally pumped into a colloid mill where high shear mixing produces the asphalt emulsion having asphalt droplets dispersed in the water.

Typically for microsurfacing formulations and optionally for slurry seal operations, the asphalt emulsions are polymer modified, e.g., to increase the strength and durability of the resulting asphalt-based, cold paving formulations and to decrease the curing times of these formulations. Typically, a polymer latex is added to the soap solution and the asphalt emulsion is produced as discussed above. Alternatively, the polymer latex can be added to the asphalt emulsion after it has been prepared or the polymer latex can be combined with the asphalt prior to mixing the asphalt with the soap solution to produce the asphalt emulsion.

Suitable polymer latices for the surface layer formulation for use in microsurfacing formulations include cationic SBR (styrene-butadiene rubber) latices, natural rubber latices, and polychloroprene latices (e.g. NEOPRENE® latices available from E.I. Du Pont de Nemours), SBS (poly(styrene-butadiene-styrene)) block copolymers and EVA (ethylene-vinyl acetate) copolymers can also be used but, typically must be added slowly to heated asphalt (e.g. 160-170° C.) and then subjected to high shear mixing to disperse the polymer in the asphalt, prior to forming the asphalt emulsion. Preferably, a cationic SBR latex is used in the asphalt emulsion. The cationic SBR latex emulsion typically includes between about 0.1 and about 10%, more preferably between about 1.0% and about 4.0% by weight cationic surfactants. The SBR latex emulsion is typically included in the asphalt emulsion in an amount from greater than 0 to about 6%, more preferably from 3.0 to 3.5% by weight. Suitable cationic SBR latices for use in the invention include BUTONAL® NX1118, BUTONAL® NX 1138, and BUTONAL® NS 198, commercially available from BASF Corporation.

The asphalt-based surface layer typically includes aggregate, water, and an asphalt emulsion. The asphalt-based surface layer typically also includes Portland cement, lime, alum, and the like. Alternatively or in addition, the asphalt-based surface layer can also include at least one first compound selected from the group consisting of alkali metal salts, ammonium salts, alkali metal hydroxides and ammonium hydroxide; and at least one second compound preferably selected from the group consisting of Group IIA, Group IIIA, Group IIIB, copper, zinc, cadmium, manganese, iron, cobalt and nickel salts. Suitable first and second compounds are disclosed in U.S. Pat. No. 6,855,754, which is incorporated by reference herein in its entirety.

The result of the method of the invention is a multilayer surface comprising a base concrete layer; a cured polymer-based layer comprising a latex polymer, an aromatic recycling agent and a emulsifier on top of at least a substantial portion of said base layer; a surface treatment layer comprising asphalt on top of said polymer-based layer; and an interfacial layer between said cured polymer-based layer and said surface treatment layer and comprising a blend of said cured polymer-based layer and said surface treatment layer. The interstitial layer forms in this manner because the emulsion layer is not fully cured when the surface treatment layer is applied and some mixing occurs on the interface between these layers. The surface treatment layer typically comprises a microsurfacing or a slurry seal layer.

The electrically neutral latices used in one embodiment of the invention are further described in the following examples. The examples are merely illustrative and do not in any way limit, the scope of the invention as described and claimed. All parts are parts by weight unless otherwise noted.

Example 1

Synthesis of an Electrically Neutral Acrylic Latex

The following ingredients were charged in a reaction vessel: 320.3 g water, 14.3 g of a 32% active seed aqueous emulsion (polystyrene), 0.7 g of a 40% aqueous solution of ethylene diamine tetraacetic acid (EDTA), and 0.7 g. of a 10% aqueous solution of potassium hydroxide (KOH). The mixture was heated to 80° C. From an initiator feed of 17.8 g water and 1.9 g sodium persulfate, 12% was removed and added to the reaction mixture. Two separate feeds were added to the vessel at a constant feed rate. The remainder of the initiator feed was added at a constant feed rate over 4.5 hours. A monomer emulsion feed, consisting of 543.1 g water, 21.3 g of a 90% active nonionic surfactant composed of an 8-mole ethylene oxide adduct of tridecyl alcohol, 5.8 g. of 10% aqueous KOH, 27.2 g of 53% aqueous acrylamide, 96.0 g. styrene, and 849.6 g n-butyl acrylate (n-BA), was added over 4.0 hours to the reactor. During the duration of the feeds, the temperature was maintained at 80° C. After the feeds were completed, the monomer emulsion tank was flushed with 28.8 g water. After a 30 minute post-reaction period the dispersion was post-stripped by adding the following two mixtures as two separate feeds over the course of an hour at a constant temperature of 80° C.: (a) 2.6 g 70% tert-butyl hydroperoxide solution and 24.0 g water, and (b) 2.0 g sodium metabisulfite, 1.2 g acetone, and 23.4 g water. After the temperature was maintained for 15 minutes following the two additional feeds, the polymer dispersion was cooled, and optional post-additions (such as biocide) were added. The final product had 49.6% total solids, a mean particle size of 196 nm, a pH of 3.2, a viscosity of 400 cps, and a glass transition temperature ($T_g$) of −42° C.

Example 2

Preparation of a Surface-Wetting Emulsion

An example emulsion was prepared according to the invention using the latex described in Example 1 as the latex, RA-1 (Golden Bear Oil Specialties, CA) as the recycling agent, and Redicote® E-4819 (Akzo Nobel) as the cationic rapid set emulsifier. A base RA-1 emulsion was first prepared by preparing an aqueous solution of 1.6% LUTENSOL® TDA-8 and adjusting the pH of the solution to about 2 with hydrochloric acid (HCl). RA-1 recycling agent was added to the adjusted solution and emulsified into the solution using a colloid mill. The resultant base RA-1 emulsion had a RA-1 content of 69% by weight, a viscosity of 35 mPa·s, and a pH of 2.3.

A CRS emulsifier solution of pH 1.5 was prepared using 0.12% REDICOTE® E-4819 in aqueous solution and HCl as a pH adjuster. The base RA-1 emulsion was diluted to 5% RA-1 using the CRS emulsifier solution to form a diluted RA-1 emulsion. An electrically neutral polymer latex prepared in accordance with Example 3 above was added to the diluted RA-1 emulsion in a weight ratio of approximately 1:10 such that the resulting surface wetting emulsion had a polymer content of 5% by weight.

Example 3

Penetration of Emulsions into Asphalt Pavement

A patch of water (about 20 ml) was placed onto an aged asphalt pavement surface and it was observed that the water penetrated the surface right away and disappeared after 2 min. As a control, a water patch similar in size was placed on a new asphalt pavement surface, and it was observed that (1) after 2 min the water had not yet visibly started to penetrate the surface, (2) after 20 min about one third of the original size of the water patch had disappeared into the pavement, and (3) after 60 min the water had disappeared (the surface was still wet).

Example 4

Penetration of Surfactant Solutions

The following solutions were prepared: (1) 0.13% by weight of REDICOTE® E-4819 (CRS surfactant) in water; (2) 1.0% by weight of LUTENSOL® TDA-8 in water. For each of the two solutions, separate patches (20 ml liquid) were placed on top of an aged asphalt pavement surface. A control patch of pure water was also added to the aged asphalt surfactant. It was observed that the pure water patch disappeared after 120 seconds, solution 1 disappeared after 50 seconds, and solution 2 after 20 seconds.

Example 5

Water Penetration on Top of Treated Aged Asphalt Surface

For this experiment, the following surface-wetting emulsions were prepared: (1) 5% RA-1 emulsion in water, containing 1.0% LUTENSOL® TDA-8; (2) a surface-wetting emulsion like the one described in Example 2 but using BUTONAL® NX 1118 as the polymer latex instead of the electrically neutral polymer latex; (3) a surface-wetting emulsion as described in Example 2. Emulsions 1-3 were sprayed onto a surface of aged asphalt pavement, and it was observed that the treated surface developed a black color for all the cases. After placing a patch of water on top of the treated surfaces (5 ml water), it was observed that the water did not penetrate the surface, but it stayed on top until it evaporated. As a comparison, when water is placed on top of untreated aged asphalt surface, it disappears into the pavement within 2 min (as described above). Comparing treated surfaces (2) and (3), it was observed that (2) felt tacky to the touch, whereas (3) did not. Accordingly, emulsion (3) is preferred and it less likely to adhere to machinery used to apply the surface treatment layer.

Many modifications and other embodiments of the inventions set forth herein will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the following appended claims.

That which is claimed:

1. A surface pretreatment composition comprising 70% by weight water or greater, an acrylic latex polymer, an aromatic recycling agent, and an emulsifier, and less than 0.5% by weight asphalt,
   wherein the aromatic recycling agent includes a recycling agent selected from the group consisting of RA-1 recycling agents, RA-5 recycling agents, and combinations thereof.

2. The composition as claimed in claim 1, wherein the acrylic latex polymer includes a styrene-acrylic latex polymer.

3. The composition as claimed in claim 1, wherein the aromatic recycling agent includes an RA-1 recycling agent.

4. The composition as claimed in claim 1, wherein the emulsifier includes a cationic emulsifier.

5. The composition as claimed in claim 4, wherein the cationic emulsifier includes a cationic rapid set emulsifier.

6. The composition as claimed in claim 1, comprising:
   from 70% to 96% by weight water;
   from 2% to 15% by weight acrylic latex polymer;
   from 2% to 15% by weight aromatic recycling agent; and
   from greater than 0% to 2% by weight emulsifier.

7. The composition as claimed in claim 1, wherein the acrylic latex polymer has an electrically neutral character when not combined with the aromatic recycling agent and the emulsifier.

8. A surface pretreatment composition comprising 70% by weight water or greater, a latex polymer, an aromatic recycling agent, and an emulsifier, and less than 0.5% by weight asphalt,
   wherein the aromatic recycling agent includes a recycling agent selected from the group consisting of RA-1 recycling agents, RA-5 recycling agents, and combinations thereof.

9. The composition as claimed in claim 8, wherein the latex polymer has an electrically neutral character when not combined with the aromatic recycling agent and the emulsifier.

10. A concentrated emulsion; comprising (1) 50-80% by weight aromatic recycling agent or (2) 25-40% by weight recycling agent and 25-40% by weight acrylic latex polymer; greater than 0 to 6% by weight emulsifier, and 14% to less than 50% by weight water, and less than 0.5% by weight asphalt,
   wherein the aromatic recycling agent includes a recycling agent selected from the group consisting of RA-1 recycling agents, RA-5 recycling agents, and combinations thereof.

11. The composition as claimed in claim 1, wherein the composition comprises 80% by weight water or greater.

12. The composition as claimed in claim 1, wherein the composition is free of asphalt.

13. The composition as claimed in claim 8, wherein the latex polymer includes a styrene-acrylic latex polymer.

14. The composition as claimed in claim 8, wherein the aromatic recycling agent includes an RA-1 recycling agent.

15. The composition as claimed in claim 8, wherein the emulsifier includes a cationic emulsifier.

16. The composition as claimed in claim 8, wherein the composition is free of asphalt.

17. The composition as claimed in claim 10, wherein the aromatic recycling agent includes an RA-1 recycling agent.

18. The composition as claimed in claim 10, wherein the emulsifier includes a cationic emulsifier.

19. The composition as claimed in claim 10, wherein the latex polymer has an electrically neutral character when not combined with the aromatic recycling agent and the emulsifier.

20. The composition as claimed in claim 10, wherein the composition is free of asphalt.

21. The composition as claimed in claim 1, wherein the total acrylic content of the acrylic latex polymer is from 35% to 100% by weight.

22. The composition as claimed in claim 8, wherein the latex polymer includes an acrylic latex polymer having a total acrylic content of from 35% to 100% by weight.

23. The composition as claimed in claim 10, wherein the total acrylic content of the acrylic latex polymer is from 35% to 100% by weight.

24. The composition as claimed in claim 1, wherein the aromatic recycling agent includes an RA-5 recycling agent.

25. The composition as claimed in claim 8, wherein the aromatic recycling agent includes an RA-5 recycling agent.

26. The composition as claimed in claim 10, wherein the aromatic recycling agent includes an RA-5 recycling agent.

\* \* \* \* \*